United States Patent [19]

Yao

[11] Patent Number: 5,317,128
[45] Date of Patent: May 31, 1994

[54] ELECTRIC HEATING UNIT FOR HEATING CONTAINER SPACE TO VARIABLE TEMPERATURE WITH CONSTANT ELECTRIC CURRENT

[75] Inventor: Kelvin K. W. Yao, Edison, N.J.

[73] Assignee: Rototech Electrical Components, Inc., Edison, N.J.

[21] Appl. No.: 747,471

[22] Filed: Aug. 13, 1991

Related U.S. Application Data

[63] Continuation of Ser. No. 565,468, Aug. 10, 1990, abandoned.

[51] Int. Cl.⁵ ............................................. F27D 11/00
[52] U.S. Cl. ................................. 219/433; 126/25 AA
[58] Field of Search ............................. 219/432–435, 219/443, 462, 521, 458–459, 456; 126/390, 25 A, 25 AA, 215; 392/467, 442; 165/96; 99/427

[56] References Cited

U.S. PATENT DOCUMENTS

| | | | |
|---|---|---|---|
| 1,786,562 | 12/1930 | Endorf | 126/215 |
| 2,118,116 | 5/1938 | Schweitzer | 219/37 |
| 2,263,350 | 11/1941 | Challet | 219/37 |
| 2,272,658 | 2/1942 | Challet | 219/37 |
| 2,477,721 | 8/1949 | Chesser et al. | 99/450 |
| 2,478,614 | 8/1949 | Wilbur | 219/462 |
| 2,833,907 | 5/1958 | Olleo, Jr. | 126/215 |
| 3,488,473 | 1/1970 | Sanders . | |
| 3,662,155 | 5/1972 | Komazaki et al. | 219/432 |
| 3,725,645 | 4/1973 | Shevlin | 219/521 |
| 3,778,594 | 12/1973 | Wightman | 219/430 |
| 3,784,787 | 1/1974 | Shevlin | 219/386 |
| 3,876,861 | 4/1975 | Wightman et al. . | |
| 3,896,973 | 7/1975 | Morgan | 222/146 |
| 4,154,218 | 5/1979 | Hulet | 126/215 |
| 4,158,125 | 6/1979 | Jones | 219/433 |
| 4,164,645 | 8/1979 | Dogliotti | 219/452 |
| 4,177,375 | 12/1979 | Meixner | 219/441 |
| 4,527,031 | 7/1985 | Aparicio | 219/10.49 |
| 4,603,684 | 8/1986 | Kazuo et al. | 126/215 |

FOREIGN PATENT DOCUMENTS

| | | | |
|---|---|---|---|
| 69008 | 12/1914 | Austria | 126/215 |
| 338307 | 6/1920 | Fed. Rep. of Germany | 126/25 A |
| 56323 | 9/1952 | France | 219/462 |
| 2444438 | 7/1980 | France | 126/25 AA |
| 7411360 | 8/1973 | Netherlands | 126/215 |

OTHER PUBLICATIONS

"TDK Honeycomb PTC Heaters".
"Using Thermaster PTC Devices".

*Primary Examiner*—Bruce A. Reynolds
*Assistant Examiner*—John A. Jeffery
*Attorney, Agent, or Firm*—Ostrager, Chong & Flaherty

[57] ABSTRACT

An apparatus for heating the contents of a container having a base with a planar heat conducting surface of predetermined shape. The apparatus includes a planar heat radiating surface of the same predetermined shape and a planar support surface for supporting the container in a stable position such that the heat conducting surface overlies the heat radiating surface. The support surface has a vertical projection in the plane of the heat radiating surface which is not coextensive with the heat radiating surface at any point. A mechanism is provided for adjusting the position of the support surface relative to the heat radiating surface in a direction perpendicular to the latter. The adjustment mechanism includes at least three rows of recesses, the recesses of each row being arranged in an ascending pattern and the rows being circumferentially distributed at equal angular intervals, and at least three projections circumferentially distributed at the same equal angular intervals. Each projection engages a respective recess of a corresponding row when the container support surface is in a corresponding position.

19 Claims, 5 Drawing Sheets

ELECTRIC HEATING UNIT FOR HEATING CONTAINER SPACE TO VARIABLE TEMPERATURE WITH CONSTANT ELECTRIC CURRENT

This is a continuation of co-pending application Ser. No. 07/565,468 filed on Aug. 10, 1990, now abandoned.

FIELD OF THE INVENTION

This invention generally relates to apparatus for warming food or beverage in a container by electrical heating of a plate, and more particularly an apparatus having means for varying the amount of heat transmitted from the heating plate to the food or beverage container without requirement of thermostatic control. Heat transfer from the plate to container is effected through mechanical adjustment in congruence of heat contacting contacting and transfer surfaces therein.

BACKGROUND ART

Electric heating units for warming food or beverage in a container are well known in the prior art. For example, U.S. Pat. No. 3,488,473 discloses a heating device for keeping coffee hot by placing a metal-lined cup on an extension of a base containing a heating element. The heating element comprises a heat-radiating circular plate mounted on the top edge of a hollow cylindrical extension of the base. The coffee cup has a circular recessed opening in its base which receives the circular heating element when the cup is placed on the extension to provide heat transfer contact.

Another heating unit particularly adapted to maintain hot potable liquid at a desired temperature is disclosed in U.S Pat. No. 3,876,861. The heating unit comprises a hollow base of circular cross section made of heat and electrically insulative material. A top wall of the base includes an annular bead, defining a circular opening in which is mounted an inverted pan made of heat conductive material. A thin disc-like plate of positive temperature coefficient resistance material is mounted in heat transfer relationship to the underside of the pan, and a thin sheet of electrically insulative, heat conductive material is interposed between the pan and the plate. Alternatively, the thin sheet of electrically insulative, heat conductive material can be eliminated if the pan is made of electrically insulative material. This patent does not depict the cup intended to be mounted on the heating unit.

The heating devices of U.S. Pat. Nos. 3,488,473 and 3,876,861 both have the disadvantage that no means are envisioned for varying the desired temperature of the beverage to be heated. These references neither disclose nor suggest mechanisms for controlling thermal coupling of heat radiating surfaces in heating elements and receptacle contact surfaces to provide temperature adjustment features. Accordingly, the applications of such devices are limited to providing fixed temperature heating sources.

A complex mechanism for adjusting thermal coupling between an electric plate and the bottom surface of a container is disclosed in U.S. Pat. No. 2,478,614. This patent shows an adjustable cooking plate assembly which comprises a base plate having an upstanding flange in which a series of superimposed plates are telescopically nested. Plates may be added or eliminated as desired to achieve a coarse adjustment of the effective cooking temperature of the uppermost plate. The spacing between the plates is varied by relative rotation of adjacent plates for adjustment of the effective cooking temperature of the uppermost plate. In particular, the means for effecting adjustment of the spacing between plates comprises stepped shoulders formed on the plates which cooperate with depending projections on the undersides of the plates stacked thereon. The projections are adapted for slidable up and down movement on the stepped shoulders in accordance with the relative rotation of the plates.

The adjustable cooking plate assembly of U.S. Pat. No. 2,478,614 has the disadvantage that it is cumbersome and expensive to manufacture due to the multiplicity of plates. The cumbersome and expensive nature of the assembly makes it wholly unsuitable for use in an electric heating device for warming a cup of coffee or a hamburger container, for example.

Accordingly, it is a broad object of the present invention to provide a heating unit having application for heating food and beverage receptacles which is of un-complex design which overcomes the disadvantages of the aforementioned prior art.

It is a further object of the invention to provide an electric heating unit in which the contents of a container, for example, a coffee mug or a sandwich receptacle, can be heated to variable temperatures through adjustment in relative conformance of receptacle and heating unit contact surfaces.

A more specific object of the invention is to provide a heating unit which includes a planar support surface for beverage and food containers, and a mechanism for effecting thermal coupling of recessed surfaces in the container, for example, concavity in cup base, to effect controlled heat transfer therein.

Yet another object of the invention is to provide food and beverage receptacles which include conductive elements which coact with a heating unit for controlled adjustment of heat transfer therebetween.

Another object of the invention is to provide an appliance for warming the contents of a container which occupies a small area and is suitable for use on desktops and tabletops.

SUMMARY OF THE INVENTION

In the present invention, the foregoing objects, as well as others which will be apparent, are achieved generally by providing an apparatus for heating the contents of a container having a base with a heat conducting surface of predetermined shape. The apparatus in accordance with the invention is an electric heating unit having means for transforming electrical current into heat radiation comprising a heat radiating surface having the same predetermined shape as the heat conducting surface of the container. In accordance with a preferred embodiment of the invention, both the heat conducting and heat radiating surfaces are substantially planar. The transforming means can, for example, comprise a rope heater or a positive temperature coefficient heater.

The electric heating unit in accordance with the invention further comprises a rotatable and axially displaceable structure for supporting the container in certain stable positions in which the heat conducting surface overlies but does not contact the heat radiating surface, each position obtaining selected efficiencies in thermal heat transfer. Maximum heating effect in accordance with the invention is achieved when the container is supported in a stable position in which the heat conducting surface contacts the heat radiating surface. The supporting structure comprises a surface having a vertical projection onto a plane which is not coextensive at any point with a vertical projection of the heat radiating surface onto that same plane. The vertical position of the supporting surface is adjustable to allow the heat radiating surface to rise above the supporting surface and project into a recess in the bottom of a container, for example, a coffee mug, so that the heat radiating surface contacts the heat conducting surface incorporated in that recessed bottom.

The electric heating device in accordance with the invention also has an adjustment mechanism for adjustably supporting the container support structure at any one of a plurality of positions, each position being axially and rotationally displaced relative to the next preceding position. At least one of the plurality of positions of the container support structure is such that the heat conducting surface of the container does not contact the heat radiating surface.

In accordance with a preferred embodiment of the invention, the heat radiating surface is circular, the container supporting surface is annular and the container base has a circular peripheral flange extending in an axial direction. The annular surface has an inner diameter which is slightly greater than the diameter of the heat radiating surface and the peripheral flange has a diameter which is greater than the inner diameter of the annular surface. This dimensional relationship ensures that the heat conducting surface of the container does not contact the heat radiating surface when: (1) the annular support surface is axially displaced below the heat radiating surface by a distance less than the height of the flange relative to the heat conducting surface and (2) the container flange is seated on the annular support surface.

A preferred adjustment mechanism of the invention comprises at least three multi-toothed recesses formed in the container support structure and a corresponding number of cylindrical projections fixedly secured relative to the heat radiating surface and representing only a single tooth designed to mesh with the teeth of the multi-toothed recesses. The recesses are circumferentially distributed at equal angular intervals about the axis. Each recess is multi-toothed in the sense that the complex shape of the recess is defined in part by a surface comprising an inclined row of contiguous teeth of the same shape. The teeth of each row are arranged in an ascending pattern and have a predetermined shape.

The projections have a surface for engaging the corresponding recesses which preferably has a cross section of the same predetermined shape as the interstitial space between teeth of the recess. However, the scope of the invention is broad enough to encompass any projection, even if not cylindrical, having a surface suitable for contacting a surface of a tooth of the corresponding recess so long as the container support structure is vertically supported at least three points. The projections are circumferentially distributed at the same equal angular intervals about the axis as are the recesses.

Each projection engages a respective interstitial space of a corresponding row when the container support structure is supported in one of its plurality of mutually vertically displaced positions. The projections are fixedly mounted relative to the heat radiating surface and the container support structure is removably mounted in the housing via coupling of the projections with the recesses.

In accordance with preferred embodiment of the invention, the teeth have a V shape (preferably an acute or right angle, although obtuse angles are suitable), a semicircular or sinusoidal shape, or any other convex shape. The projections preferably have a cross-sectional shape conforming to the shape of the interstitial spaces between the teeth of the recesses, although such si not necessary. For example, circular cylindrical projections could engage V-shaped interstitial spaced without detrimentally affecting the ability of the housing to vertically support the container support structure.

Alteratively, the adjustment mechanism comprises at lest three multi-toothed recesses formed in the container support structure and a corresponding number of multi-toothed projections fixedly secured relative to the heat radiating surface. The teeth of the projections are designed to mesh with the teeth of the multi-toothed recesses. Again the teeth of the recesses are arranged in an ascending pattern and have a predetermined shape. The recesses are circumferentially distributed at equal angular intervals about the axis. Similarly the teeth of the projections are arranged in an ascending pattern and have the same predetermined shape as the recesses. The rows of projections are circumferentially distributed at the same equal angular intervals about the axis.

In accordance with the latter embodiment, for each pair of cooperating recesses and projections, a different number of teeth on the projections engage the respective recesses when the container support structure is in a corresponding one of its plurality of positions. The row of teeth can be formed as separate or contiguous teeth.

Other objects, features and advantages of the present invention will be apparent when the detailed description of the preferred embodiments of the invention are considered in conjunction with the drawings which should be construed in an illustrative and not limiting sense.

BEST MODE OF CARRYING OUT THE INVENTION

Figure 1:
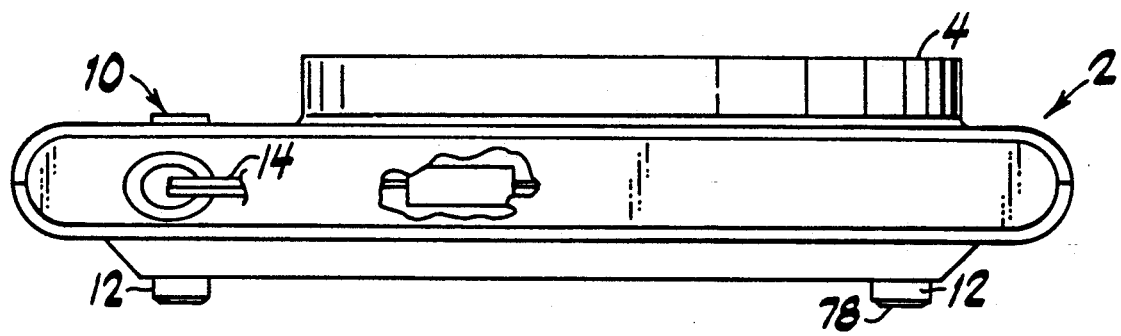
FIG. 1 is elevational view of the electric heating unit in accordance with the invention.
Figure 2:
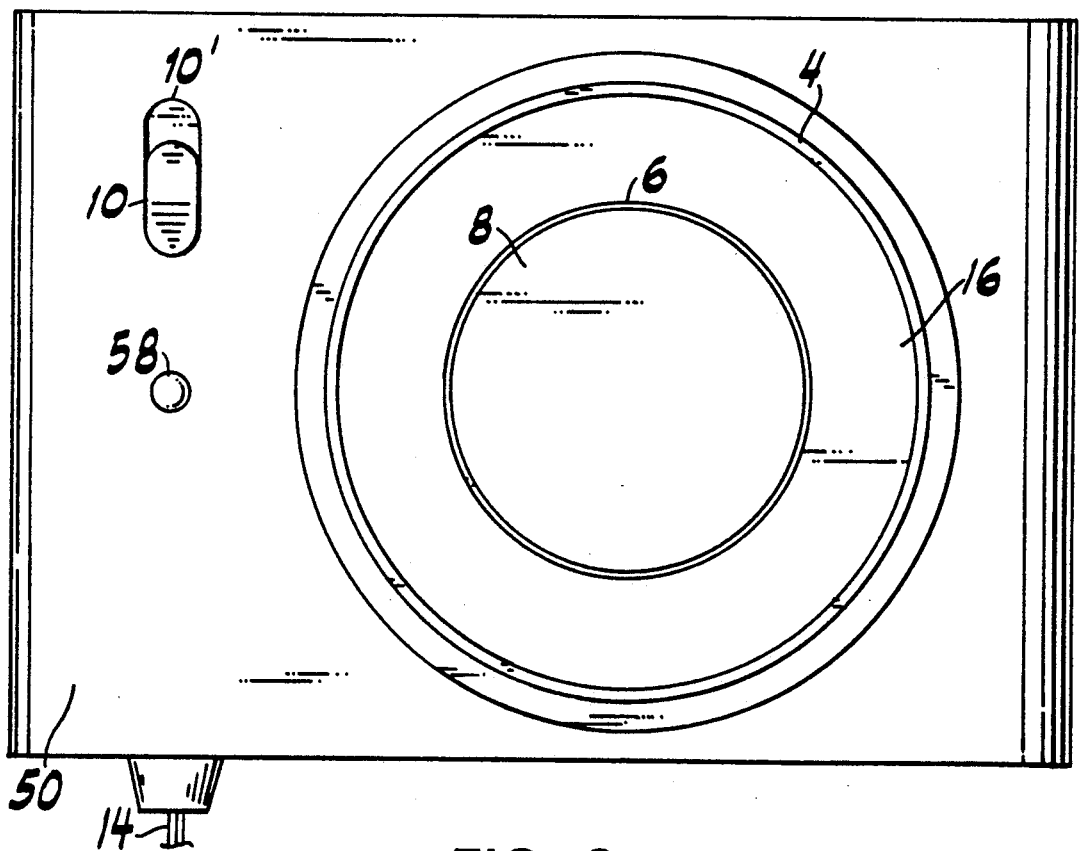
FIG. 2 is a top view thereof.

In accordance with the invention as generally depicted in FIGS. 1 and 2, a housing 2 has electrical circuitry for controlling a heater assembled inside. The adjustment mechanism in accordance with the invention is a ring 4 which is rotatable and axially displaceable relative to the housing 2. A stationary heater base 6 has a circular heating surface 8 which is concentrically arranged relative to annular support surface 16 of movable ring 4.

An ON-OFF switch 10 is slidably mounted in an aperture 10' formed in a top surface 50 of the housing 2. The appliance receives electrical power from a power supply (not shown) by way of a conventional electrical cord 14. The condition wherein the appliance is switched on is indicated by an indicator light 58, which turns on when the power is switched on. Preferably indicator light 58 is a light emitting diode.

The housing 2 is supported on a flat surface by a plurality of pedestals 12, preferably four in number and circular cylindrical in shape. The pedestals do not contact the flat surface directly because a rubber pad 78 is adhered to the radial end surface of each pedestal 12 to prevent scratching of the flat surface by the pedestals and to prevent the appliance from sliding or displacement.

Figure 3:
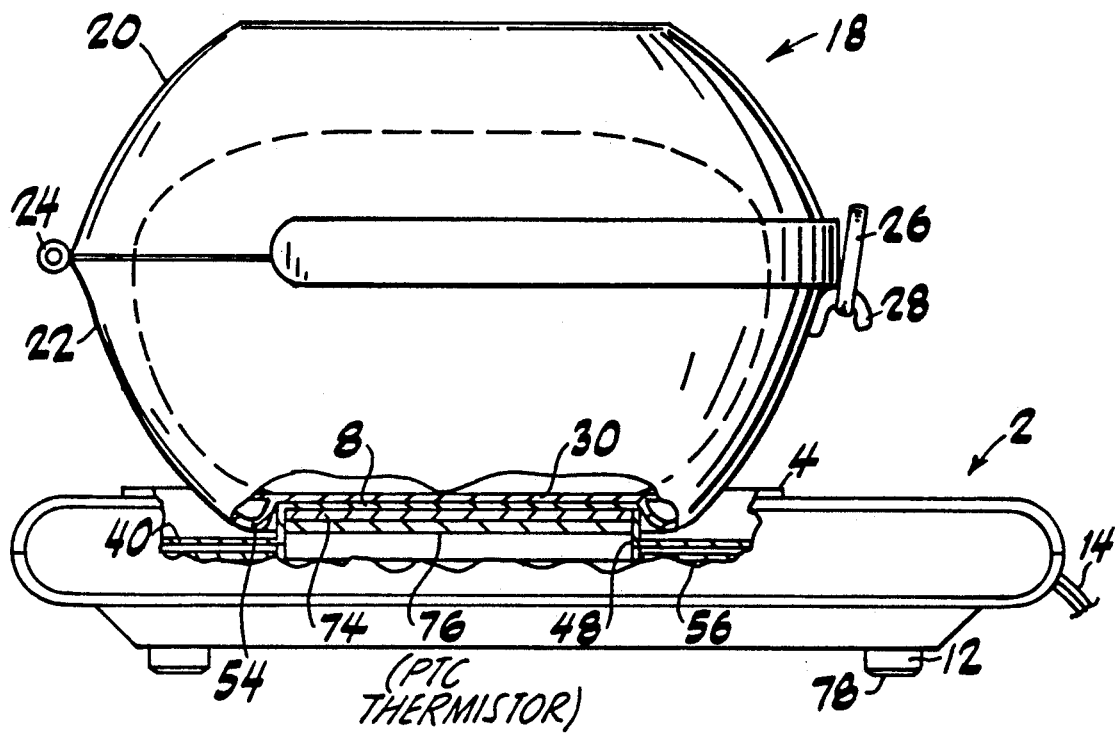
FIG. 3 is a front view of the electric heating unit of FIG. 1, with a food container mounted thereon, cutaway portions of both the heating unit and the container being depicted in cross section.

FIG. 3 is a partially sectioned view of the appliance in accordance with the preferred embodiment of the invention with a food container 18 mounted thereon. The food container 18 is of the clam-shell type having upper and lower convex dishes 20 and 22 respectively which are rotatably coupled to each other by a hinge 4 and which together form an enclosed space in which a food item can be contained. The food container 18 can be latched in the closed condition by means of ring 26 and hook 28 respectively fixedly mounted on the upper and lower dishes 20 and 22.

The lower dish 22 of food container 18 has a heat conducting insert 30 incorporated therein. In the preferred embodiment insert 30 is formed from a thin sheet of metal, preferably aluminum, and includes a generally planar portion which closes a recessed circular aperture formed in the base of dish 22. Optionally the insert may include one or more portions thermally coupled to the planar portion and incorporated on the inner surface of lower dish 22.

In accordance with the preferred embodiment, the heat radiating surface 8 is planar and circular, having a diameter which is less than the diameter of the recessed aperture formed in the base of dish 22. In accordance with the foregoing structural arrangement, a food item placed in the container can be thermally coupled to, i.e., heated by, the heat radiating surface 8 via the heat conducting insert 30. If the heat conducting insert 3 and heat radiating surface 8 are in direct contact, then this thermally coupling is effected by the conduction of heat from the latter to the former. Alternatively, if the container is raised, as described in detail below, relative to its position where the heat conducting insert 30 and heat radiating surface 8 are in direct contact, the heat conducting insert 30 and heat radiating surface 8 will be separated by a gap, in which case the thermal coupling is effected by heat convection occurring in the space therebetween.

Figure 5:
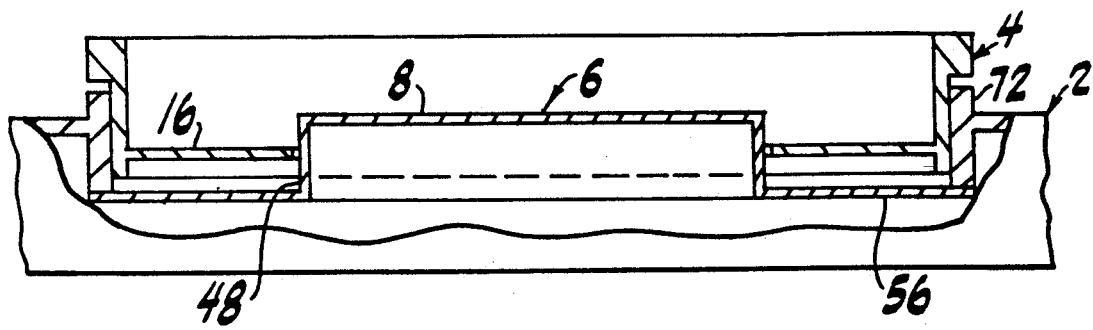
FIGS. 5 and 6 are partial views of the assembled electric heating unit in accordance with the invention, with cutaway portions of the heating unit being depicted in cross section, with the recesses and projections omitted for ease of understanding of the drawing and with the movable ring of FIG. 4 depicted in first and second positions respectively, the second position depicted in FIG. 6 being higher than the first position depicted in FIG. 5.

The base of the container 18 comprises a peripheral embossment 54, the inward circumferential edge of which forms the aforementioned circular aperture that is closed by metal insert 30. As will be described in detail below, the heat conducting insert 30 and heat radiating surface 8 are separated by a gap only when the container 18 is supported via embossment 54 by an annular support surface 16 of the movable ring 4. When the heat conducting insert 30 and heat radiating surface 8 are in direct contact, the container 18 is supported via insert 30 by heat radiating surface 8. As best seen in FIG. 5, the heat radiating surface 8 is fixedly secured to housing 2 by way of radial surface 56 and circumferential surface 48.

FIG. 3 shows the basic structure of the heater 6, which in accordance with one preferred embodiment comprises a PTC thermistor 76 which is thermally coupled to heat radiating surface 8 via a plate 74 of electrically insulating and heat conductive material. The conventional PTC thermistor is a thermal resistor having a positive temperature coefficient, i.e., its resistance increases as its temperature rises. It is a semiconductor ceramic manufactured by sintering a high-purity mixture material, of which the main ingredient is barium titanate. The advantageous characteristic of such a heating element is that at temperatures above the Curie point, the resistance increases dramatically with increasing temperature. In practice, this resistance characteristic causes the thermistor temperature to remain essentially constant over a wide range of operational conditions. Variations in ambient temperature, applied voltage and heat transfer have but small effect on thermistor temperature.

Figure 4:
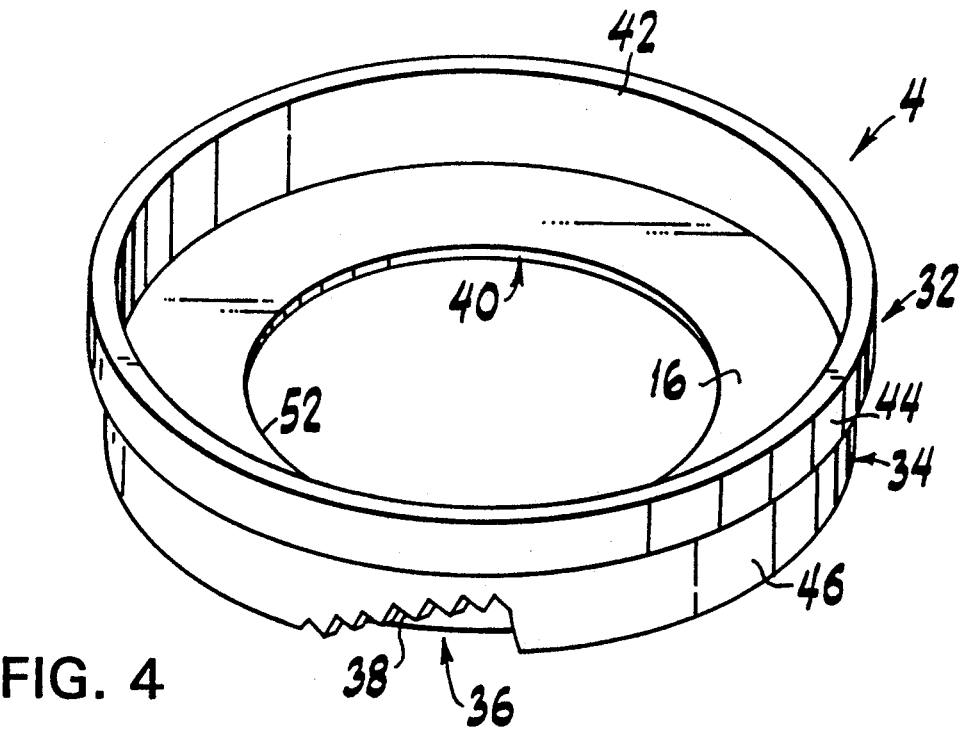
FIG. 4 is a perspective view of a movable ring incorporated in the electric heating unit in accordance with a preferred embodiment of the invention.

As depicted in FIG. 4, the movable ring 4 comprises a circumferential rim 32 having an outer circumferential surface 44 and a circular cylindrical section 34 connected to circumferential rim 32. Rim 32 and section 34 form one inner circumferential surface 42. Section 34 has an outer circumferential surface 46 of diameter less than the diameter of a circular opening (not shown) in the top surface 50 (see FIG. 2) of housing 2 for slidable insertion therein.

When the movable ring 4 is inserted in housing 2, circular cylindrical section 34 slidably engages the aforementioned circular opening in top surface 50 of housing 2. There is a slight gap between surface 46 and an inner circumferential surface (not shown) of that circular opening sufficient in magnitude to allow easy rotation and vertical displacement of movable ring 4 relative to the housing 2.

The movable ring 4 further comprises an annular radial section 40 having a circular opening 52 and a top surface previously identified as annular support surface 16. The diameter of circular opening 52 is slightly greater than the outer diameter of heater base 6. There is a slight gap between the outer circumferential surface of heater base 6 and an inner circumferential surface of circular opening 52 sufficient in magnitude to allow easy rotation and vertical displacement of movable ring 4 relative to the heater base 6.

Figure 7A:
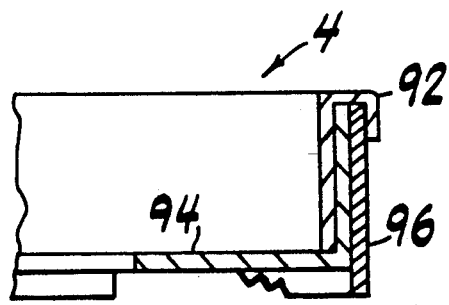
FIG. 7A is a partial sectional view of the movable ring of the electric heating unit in accordance with the preferred embodiment depicted in FIG. 4.

In accordance with the preferred embodiments, the movable ring has a composite structure as shown in FIG. 7A, although it is readily understood that the movable ring could be made from a single integrally formed unit made of plastic material and formed by injection molding, for example. The composite structure comprises three rings 92, 94 and 96 having cross sections as shown. Ring 96 is a circular cylindrical section made of electrically insulating material and having the multitooth recesses 38 formed therein. The outer surface of ring 96 forms the outer circumferential surface 46 (see FIG. 4) of the movable ring. Ring 94 comprises a circular cylindrical section and an annular radial section, the latter forming the annular support surface 16 (see FIG. 4). Ring 92 comprises an inner and outer circular circumferential sections connected by an annular radial section. The inner surface of the inner circular circumferential section forms the inner circumferential surface 42 and the outer surface of the outer circular circumferential section forms the outer circumferential surface 44 (see FIG. 4).

The annular support surface 16 has an inner radius less than the radius of circumferential embossment 54 on container 18 (see FIG. 3). The recess formed by embossment 54 has a predetermined depth measured in the direction perpendicular to the planar surface of insert 30. When the movable ring is in its lowermost position as shown in FIG. 3, the annular support surface 16 does not contact the embossment 54 and the lower surface of heat-conducting insert 30 of container 18 is in direct contact with the heat-radiating surface 8 of heating base 6.

Figure 6:
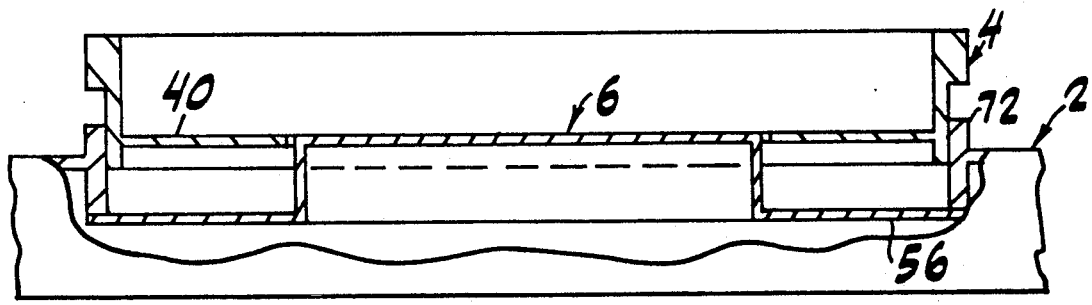

When the movable ring 4 is raised from its lowermost position by an amount equal to the height of the gap between the annular support surface 16 and the embossment 54 to the position shown in FIG. 5, the annular support surface 16 contacts the embossment 54. As the movable ring is raised further in the vertical direction, i.e., beyond the first point of contact with the embossment 54 to the position shown in FIG. 6, container 18 is lifted to provide an air gap between heat-conducting insert 30 and heat-radiating surface 8. The height of the air gap can be varied by adjusting the vertical position of movable ring 4.

This variation in the height of the air gap in turn causes a variation in the amount of heat convected from the heat-radiating surface 8 to the heat-conducting insert 30. This variation in heat convection in turn produces a variation in the heating temperature produced inside the container. Thus the heating temperature of the electric heating appliance in accordance with the invention can be varied without varying the amount of electrical current supplied to the heating element.

In accordance with the preferred embodiments of the invention, the vertical position of the movable ring 4 relative to the housing 2 is adjusted by means of a plurality of multitooth recesses circumferentially distributed at equal angular intervals on the outer circumferential surface 46 of cylindrical section 34. Each recess has a complex shape which includes an ascending stepped portion. The ascending stepped portion of the recess cooperates with a corresponding one of a plurality of projections which project radially inwardly from and are circumferentially distributed at equal angular intervals on the inner circumferential surface of flange 72 (see FIGS. 5 and 6) which defines the circular opening of housing 2.

In accordance with the first preferred embodiment of the invention depicted in FIG. 4, three or more recesses 36 are arranged at equal angular intervals (only one such recess is depicted). In the case of four recesses, the angular interval is 90 degrees. Each recess has a stepped ascending portion 38 made up of an inclined row of triangular teeth which form triangular recesses therebetween. In accordance with the first preferred embodiment, the inner circumferential surface of flange 72 (see FIG. 9) has a corresponding number of projections 80 of triangular cross section which project radially inwardly and are circumferentially distributed at equal angular intervals. Each of the projections 80 is seated in a corresponding triangular recess of the ascending stepped portion of recesses 36. The movable ring 4 is thus supported at the points of engagement with projections 80.

Figure 7B:
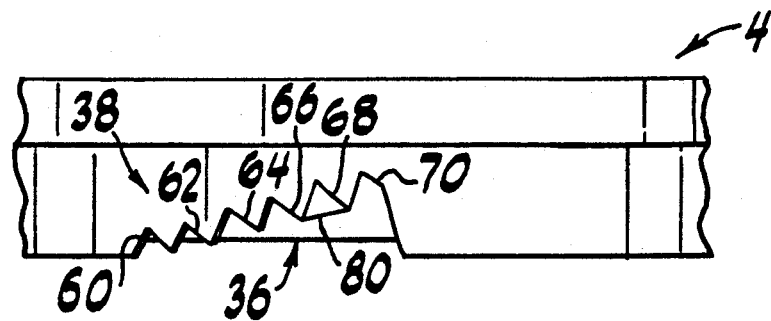
FIG. 7B is a partial side view of the movable ring of the electric heating unit in accordance with the preferred embodiment depicted in FIG. 4, showing a recess with an ascending row of teeth engaged by a cylindrical projection of triangular cross section attached to the housing.

The movable ring 4 is at its uppermost vertical position when each projection 80 respectively engages the lowermost intertooth space 60 of the corresponding ascending stepped portion 38 (see FIG. 7). The movable ring 4 can be located at successively lower vertical positions by successively aligning the each projection 80 to respectively engage the next higher multitooth space of the corresponding ascending stepped portion 38, that is, the projection 80 successively engages intertooth spaces 62, 64, 66 and 68 during the stepped adjustment of the vertical position of the movable ring from its uppermost to its lowermost positions. The movable ring 4 is at its lowermost vertical position when each projection 80 respectively engages the uppermost intertooth space 70 of the corresponding ascending stepped portion 38.

Figure 8:
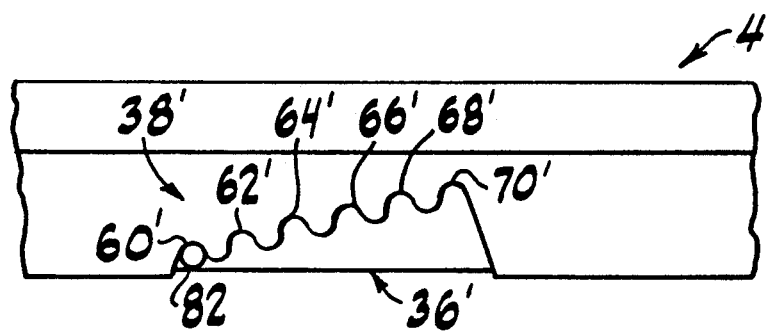
FIG. 8 is a partial side view of the movable ring of the electric heating unit in accordance with another preferred embodiment of the invention, showing a recess engaged by a cylindrical projection of circular cross section attached to the housing.
Figure 9:
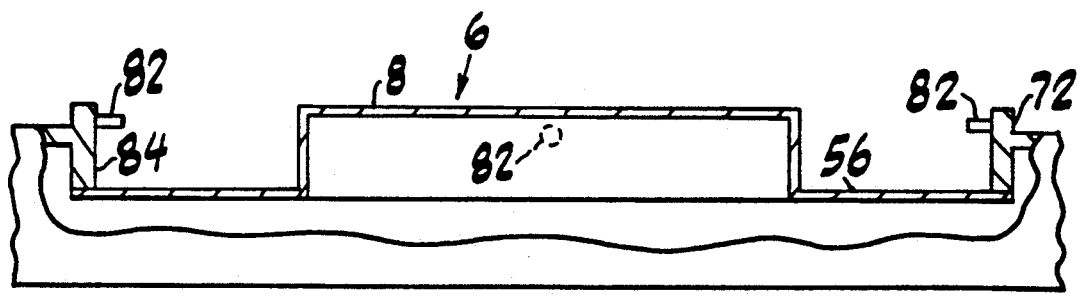
FIG. 9 is a partial view of the electric heating unit in accordance with the preferred embodiment shown in FIG. 8, with cutaway portions of the heater base depicted in cross section, and with the movable ring removed.

It will be recognized that the intertooth spaces of the ascending stepped portion 38 and the corresponding projection in accordance with a preferred embodiment of the invention need not be triangular. Other shapes are equally suitable provided only that the respective shapes of the spaces and projections interlock in a form-fitting manner that blocks rotation of the movable ring 4. For example, the intertooth spaces of the ascending stepped portion 38' can have a semicircular shape for receiving a projection 82 having a circular cross section as shown in FIG. 8. FIG. 9 shows the position of such projections when the number of recesses and projections is respectively four, distributed at angular intervals of 90 degrees.

Alternatively, the ascending stepped portion could have a sinusoidal pattern for receiving projections of circular cross section or projections having some other suitable curved surface for engaging the curved recesses of such a sinusoidal pattern. In particular, the cross section of the contacting surface of the projections may have the shape of a sinusoid.

Similarly, in accordance with another preferred embodiment, the projection 80 of triangular cross section depicted in FIG. 7 can be replaced by any radially inwardly directed projection for which the cross section of the contacting surface is V-shaped, the angle of the V being substantially equal to the angle of the triangular intertooth spaces of the ascending stepped portion shown in FIG. 7.

In accordance with an alternative embodiment (not shown), the ascending stepped portion 38 can have the shape of a staircase formed by alternating vertical and horizontal edges. In such an embodiment the movable ring is vertically supported by the projections on which the corresponding horizontal edges of the staircase bear. Although the vertical edges block rotation of the movable ring 4 in one direction, no means are provided for blocking rotation of movable ring 4 in the other direction. This alternative embodiment relies on the force of friction to maintain the movable ring 4 at its angular position in the absence of the application of a rotational force in the aforementioned other direction.

It will be recognized that the number of circumferentially distributed recesses and projections need only be sufficient in number to stably support the movable ring about its circumference. For example, the movable ring can be provided with only three recesses which respectively cooperate with three projections, the recesses and projections being circumferentially distributed at equal angular intervals of 120°.

Moreover, in accordance with other preferred embodiments of the invention, the projections which project radially inwardly from the inner circumferential surface 72 of housing 2 may have multiple contacting surfaces for engaging a plurality of recesses of each ascending stepped portion 38 of the movable ring 4. This may take the form of multiple projections arranged in an ascending row or a single complex-shaped projection identical in shape to the recess or having a pattern of contacting surfaces only substantially similar in shape to that of the ascending stepped portion. In this case the movable ring 4 is at its uppermost vertical position when all of the teeth of each projection engage respective all of the corresponding intertooth spaces of the corresponding ascending stepped portion. To obtain incremental adjustment of the vertical position of the movable ring, the projection can be aligned with the ascending stepped portion such that successively fewer teeth engage corresponding spaces. In particular, the movable ring can be located at successively higher vertical positions by successively aligning each projection so that a decreasing number of teeth engage intertooth spaces of the corresponding ascending stepped portion. Ultimately only the last tooth of each projection engages a corresponding last intertooth space, whereat the movable ring is at its uppermost vertical position.

Similarly, it will be appreciated that the ascending stepped pattern of teeth can be provided on the inner circumferential surface of housing 2 instead of on the outer circumferential surface 46 of cylindrical section 34; and the engaging projections can be provided on the outer circumferential surface 46 of cylindrical section 34 instead of on the inner circumferential surface of housing 2.

Furthermore, resolution of the adjustment of the vertical position of movable ring 4 can be made finer by increasing the number of teeth per unit height of the ascending stepped portion 38

Finally, the cooperating recesses and projections could be replaced by cooperating threads formed on the outer circumferential surface 46 of movable ring 4 and on the inner circumferential surface 84 of housing 2.

Figure 10:
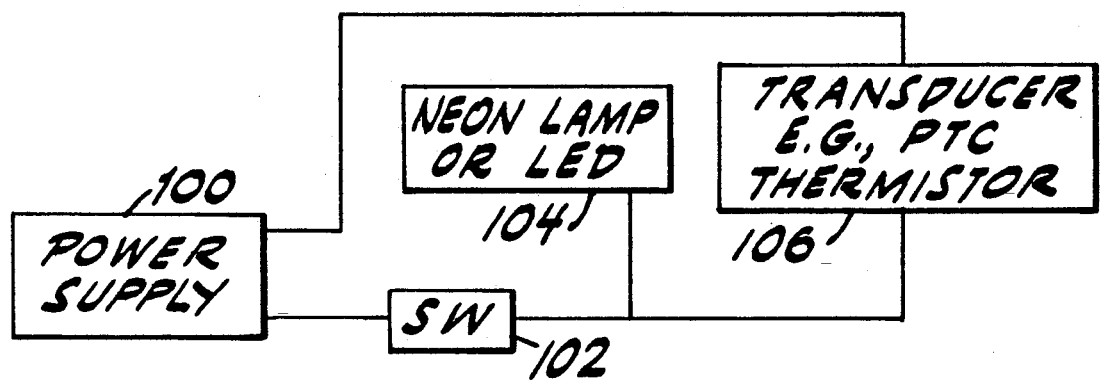
FIG. 10 is a block diagram depicting the main electric circuit components in accordance with the invention.

The electrical circuitry of the electric heating appliance in accordance with the invention is generally shown in FIG. 10. The transducing means 106 for converting electric current into heat (e.g., PTC thermistor 76 in FIG. 3) is connected in parallel with a lamp neon 104 or light-emitting diode across the terminals of a power supply 100. The supply of electric current to both the neon 104 and the transducer 106 is controlled by ON-OFF switch 102.

Although the invention has been described with reference to certain preferred embodiments, it will be appreciated that other electric heating units may be designed which are nevertheless within the scope and spirit of the invention as defined in the claims appended hereto.

I claim:

1. An apparatus for heating the contents of a container having a recess with a planar heat conducting surface formed in a bottom thereof, comprising:
    a housing having an opening;
    a plug-in electrical cord for receiving an electrical current, said cord having an end arranged in said opening in said housing;
    means electrically coupled to sad cord for transforming said electrical current into heat radiation, said transforming means comprising a planar heat radiating surface supported by said housing;
    means for supporting sad container in a stable position overlying said heat radiating surface, said container supporting means comprising an annular support surface which supports said container at a plurality of points of contact, said annular support surface having an aperture of diameter such that said planar heat radiating surface passes freely there through; and
    first adjustment means located on a radially outer periphery of said container supporting means and second adjustment means located on said housing, said first and second adjustment means being coupled to adjustably support said container supporting means in any one of a plurality of positions, each of said plurality of positions being linearly displaced in a direction perpendicular to said planar heat radiating surface relative to the next preceding one of said plurality of positions and rotationally displaced about an axis perpendicular to said planar heat radiating surface relative to said next preceding one of said plurality of positions, at least one of said plurality of positions of said container supporting means being such that said annular support surface lies below said heat radiating surface and said hat radiating surface contacts said heat conducting surface when said container is supported by said annular support surface.

2. The apparatus as defined in claim 1, wherein said heat radiating surface is circular.

3. The apparatus as defined in claim 2, wherein said annular surface has an inner diameter which is slightly greater than the diameter of said heat radiating surface.

4. The apparatus as defined in claim 1, wherein said transforming means comprises a positive temperature coefficient heater.

5. The apparatus as defined in claim 1, further comprising a housing for said transforming means, wherein said adjustment means comprises at least three rows of teeth secured to said object supporting means, the teeth of each row being arranged in an ascending pattern and having a predetermined shape and said rows being circumferentially distributed at equal angular intervals about said axis, and further comprises at least three projections fixedly secured to said housing, said projections having said predetermined shape and being circumferentially distributed at said equal angular intervals about said axis, and each of said projections engaging a respective intertooth space between adjacent teeth of a corresponding one of said rows when said object supporting means is in a corresponding one of said plurality of positions.

6. The apparatus as defined in claim 5, wherein said projections are fixedly mounted relative to said housing and said object supporting means is removably coupled to said projections by way of said intertooth spaces.

7. The apparatus as defined in claim 5, wherein each of said intertooth spaces has a triangular shape.

8. The apparatus as defined in claim 5, wherein each of said intertooth spaces has a semicircular shape.

9. The apparatus as defined in claim 1, wherein said first adjustment means comprises at least three rows of teeth secured to said object supporting means, the teeth of each row being arranged in an ascending pattern and having a predetermined shape and said rows being circumferentially distributed at equal angular intervals about said axis, and said second adjustment means comprises at least three rows of teeth fixedly secured to said housing, the teeth of each row being arranged in an ascending pattern and having said predetermined shape and said rows being circumferentially distributed at said equal angular intervals about said axis, and n teeth for each row of teeth on said object supporting means engage in intertooth spaces of corresponding ones of said rows of teeth on said housing when said object supporting means is in a first one of said plurality of positions and n−1 teeth for each row of teeth on said object supporting means engage n−1 intertooth spaces of corresponding ones of said rows of teeth on said housing when said object supporting means is in a second one of said plurality of positions, where n is an integer less than or equal to the number of teeth in a row and greater than unity.

10. A heater arrangement comprising a container having a base with a planar heat conducting surface of predetermined shape arranged in a recess formed therein, and an apparatus for heating the contents of said container, said apparatus comprising:
   a housing having an opening;
   a plug-in electrical cord for receiving an electrical current, said cord having an end arranged in said opening in said housing;
   means electrically coupled to said cord for transforming said electrical current into heat radiation, said transforming means comprising a planar heat radiating surface having a shape substantially similar to said predetermined shape which is supported by said housing in a horizontal plane;
   means for supporting said container in a stable position whereat said heat conducting surface overlies said heat radiating surface, said supporting means comprising an annular support surface arranged substantially parallel to said heat radiating surface, said annular support surface supporting said container along a contour of contact and having an aperture of diameter such that said planar heat radiating surface passes freely there through; and
   first adjustment means located on a radially outer periphery of said container supporting means and second adjustment means located on said housing, said first and second adjustment means being coupled to adjustably support said container supporting means in any one of a plurality of positions, each of said plurality of positions being linearly displaced in a direction perpendicular to said planar heat radiating surface relative to the next preceding one of said plurality of positions and rotationally displaced about an axis perpendicular to said planar heat radiating surface relative to said next preceding one of said plurality of positions, at least one of said plurality of positions of said container supporting means being such that said annular support surface lies below said heat radiating surface and said heat radiating surface contacts said heat conducting surface when said container is supported by said annular support surface.

11. The apparatus as defined in claim 10, wherein said heat radiating surface is circular, and said container base has a circular peripheral edge, said annular surface having an inner diameter which is slightly greater than the diameter of said heat radiating surface and said peripheral edge having a diameter which is greater than said inner diameter.

12. The apparatus as defined in claim 10, wherein said transforming means comprises a positive temperature coefficient heater.

13. The apparatus as defined in claim 10, further comprising a housing for said transforming means, wherein said adjustment means comprises at least three rows of teeth secured to said object supporting means, the teeth of each row being arranged in an ascending pattern and having a predetermined shape and said rows being circumferentially distributed at equal angular intervals about said axis, and further comprises at least three projections fixedly secured to said housing, said projections having said predetermined shape and being circumferentially distributed at said equal angular intervals about said axis, and each of said projections engaging a respective intertooth space between adjacent teeth of a corresponding one of said rows when said object supporting means is in a corresponding one of said plurality of positions.

14. The apparatus as defined in claim 13, wherein said projections are fixedly mounted relative to said housing and said object supporting means is removably coupled to said projections by way of said intertooth spaces.

15. The apparatus as defined in claim 13, wherein each of said intertooth spaces has a triangular shape.

16. The apparatus as defined in claim 13, wherein each of said intertooth spaces has a semicircular shape.

17. The apparatus as defined in claim 11, further wherein said first adjustment means comprises at lest three rows of teeth secured to said container supporting means, the teeth of each row being arranged in an ascending pattern and having a predetermined shape and is a rows being circumferentially distributed at equal angular intervals about said axis, and said second adjustment means comprises at least three rows of teeth fixedly secured to said housing, the teeth of each row being arranged in an ascending pattern and having said predetermined shape and said rows being circumferentially distributed at said equal angular intervals about said axis, and n teeth for each row of teeth on said container supporting means engage n intertooth spaces of corresponding ones of said rows of teeth on said housing when said container supporting means is in a first one of said plurality of positions and n−1 teeth for each row of teeth on said container supporting mean engage n−1 intertooth spaces of corresponding ones of said rows of teeth on said housing when said container supporting means is in a second one of said plurality of positions, where n is an integer less than or equal to the number of teeth in a row and greater than unity.

18. An electric heating appliance comprising:
   a housing having an opening;

a plug-in electrical cord for receiving an electrical current, said cord having an end arranged in said opening in said housing;

means electrically coupled to said cord for radiating heat from a planar heat radiating surface thereof in response to receipt of said electrical current, said heat radiating means being supported by said housing;

means for supporting a container comprising an annular support surface having an aperture of diameter such that said planar heat radiating surface passes freely there through; and first adjustment means located on a radially outer periphery of said container supporting means and second adjustment means located on said housing, said first and second adjustment means being coupled to adjustably support said container supporting means in any one of a plurality of successive positions which are relatively displaced with respect to each other in a first direction, a first position of said plurality of successive positions being such that said heat radiating surface lies within said aperture and is co-planar with said annular support surface of said container supporting means, and a second position of said plurality of successive positions being such that said heat radiating surface lies above said annular support surface.

19. The appliance as defined in claim 18, wherein said surface of said heat radiating means is circular and has a diameter which is slightly less than a diameter of said aperture, and said first direction being substantially perpendicular to said surface of said heat radiating means.

* * * * *